(12) United States Patent
Field

(10) Patent No.: US 6,720,368 B2
(45) Date of Patent: Apr. 13, 2004

(54) MATT, THIXOTROPIC PAINT FORMULATION

(75) Inventor: Rex J. Field, Worms (DE)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 10/094,391

(22) Filed: Mar. 8, 2002

(65) Prior Publication Data

US 2002/0173561 A1 Nov. 21, 2002

Related U.S. Application Data

(60) Provisional application No. 60/276,050, filed on Mar. 15, 2001.

(51) Int. Cl.$^7$ .............. C08J 3/00; C08K 9/00; C08K 9/06; C08L 75/00; C08L 67/00
(52) U.S. Cl. .......... 523/200; 523/205; 523/209; 523/212; 523/214; 523/216; 524/492; 524/493; 524/494; 524/556; 524/590; 524/599; 524/601; 524/612; 524/847
(58) Field of Search .................. 523/200, 205, 523/209, 212, 214, 216; 524/492, 493, 494, 556, 590, 599, 601, 612, 847

(56) References Cited

U.S. PATENT DOCUMENTS

| | | | |
|---|---|---|---|
| 3,249,463 A | 5/1966 | Carlée |
| 3,634,288 A | 1/1972 | Youngs |
| 3,953,646 A | 4/1976 | Fletcher et al. |
| 4,081,412 A | 3/1978 | Doroszkowski et al. |
| 4,158,631 A | 6/1979 | Whelan |
| 4,263,051 A | 4/1981 | Crawford et al. |
| 4,374,687 A | 2/1983 | Yamamoto |
| 4,792,357 A | 12/1988 | Bier |
| 5,009,874 A | 4/1991 | Parmentier et al. |
| 5,098,938 A | 3/1992 | Savin |
| 5,221,337 A | 6/1993 | Lüers et al. |
| 5,519,080 A | 5/1996 | Matsushita et al. |
| 5,637,636 A | 6/1997 | Cartwright et al. |
| 5,738,801 A | 4/1998 | Ziegler et al. |
| 5,814,397 A | 9/1998 | Cagliostro et al. |
| 5,928,723 A | 7/1999 | Koehlert et al. |
| 5,936,021 A | 8/1999 | Bryant et al. |
| 6,143,400 A | 11/2000 | Schwertfeger et al. |
| 2001/0034375 A1 | 10/2001 | Schwertfeger et al. |

FOREIGN PATENT DOCUMENTS

| | | |
|---|---|---|
| DE | 199 24 170 A1 | 11/2000 |
| EP | 0 442 325 A1 | 8/1991 |
| GB | 721 605 | 1/1955 |
| GB | 1 062 599 | 3/1967 |
| GB | 1 363 039 | 8/1974 |
| JP | 9-217278 A2 | 8/1997 |
| WO | WO 96/02158 A1 | 1/1996 |

OTHER PUBLICATIONS

Aldcroft, D., *Polymers Paint Color Journal*, vol. 184, No. 4358, pp. 423–425 (Sep. 7, 1994).

Field, R.J. et al., "Matting of UV Coatings with Silica: Effects of Particle Size (Part 2)," *PPCJ*, pp.35–38 (Nov. 1995).

Maskery, S. E., "The Dispersion, Matting Efficiency and Formulation of Silica Matting Agents in Wood Finishes," *Lecture to be Given to the Association of Paint Technologists at the Paint and Polymers Exhibition in Milan* (Nov. 3, 1981).

Maskery, S.E., "Development and Applications for Matting Agents," *Pigment and Resin Technology*, pp. 11–19 (Apr. 1973).

"Monsanto's Silica Aerogel for Efficient Thermal Insulation," *Monsanto Technical Bulletin*, I–180, pp. 1–10 (Oct. 1959).

Monsanto Applications Guide to the Effective Use of Santocel© Silica Aerogeis.

Monsanto's Santocel brochure, pp. 1–10.

"Today's Flatting Agents for Tomorrow's Formulation," *Degussa Technical Library*, GP–91, pp. 1–6.

"HK 188 vs. Syloid 244," *Degussa Technical Library*, GP–98, pp. 1–8.

Aerosil® for Lacquers and Paints,*Technical Bulletin Pigments*, Degussa No. 68, pp. 1–28.

*Primary Examiner*—Patrick D. Niland

(57) ABSTRACT

The invention provides a matt, thixotropic paint formulation comprising a resin system and a matting agent. The matting agent comprises a hydrophobic metal oxide, which has a surface moiety (i.e., one or more surface moieties) selected from the group consisting of trimethyl silyl, vinyl dimethyl silyl, acryl dimethyl silyl, and dimethyl silyl. Morever, the paint formulation is characterized by having thixotropic properties such that it does not sag at a notch height of about 75 μm when measured with an anti-sag meter after application to a substrate. The invention also provides a method of producing such a paint formulation. The invention further provides a substrate having a surface coated with the matt, thixotropic paint formulation of the invention.

10 Claims, No Drawings

MATT, THIXOTROPIC PAINT FORMULATION

CROSS REFERENCE TO RELATED PATENT APPLICATIONS

This patent application claims priority to provisional U.S. Patent Application No. 60/276,050 filed Mar. 15, 2001.

FIELD OF THE INVENTION

This invention pertains to a matt, thixotropic paint formulation and a method of producing such a paint formulation.

BACKGROUND OF THE INVENTION

Metal oxides, particularly silica, have been incorporated into certain surface coating materials in order to achieve the impression of "mattness." A wet film applied to a substrate is initially held flat by the forces of surface tension, thereby resulting in a glossy surface. As the film dries and cures, the increasing viscoelasticity associated with the sol-gel transition hinders the movement of particles into the film, and the surface deforms to accommodate the matting agent particles. This roughness is maintained in the solidified film, which then is characterized by a matt finish. While the matting effect attributable to certain metal oxides, especially porous silicas, produces a desirable surface appearance for some applications, a paint formulation desirably possesses additional properties, such as a certain degree of thixotropy, in order to enhance its utility for a variety of applications.

Thixotropy is a characteristic of a paint formulation that relates to its viscosity. Indeed, as a paint formulation becomes more thixotropic, the sagging behavior of the paint becomes less apparent. For certain applications, a highly thixotropic paint is desired so as to minimize dripping, running, and sagging during application. Prior attempts at improving the thixotropic properties of a paint formulation have used a number of additives, such as modified resins and metal oxides into the formulation.

Silica, an inorganic material having silicon dioxide ($SiO_2$) as a basic structural unit, is useful in a wide variety of commercial applications. Silica exists in a variety of molecular forms, which include, for example, monomers, dimers, oligomers, cyclic forms, and polymers. In addition, silica can be amorphous, crystalline, hydrated, solvated, or dry, and can exist in a variety of particulate and aggregated states.

Amorphous silica can be formed by molecular precipitation, for example, by cooling a supersaturated solution, concentrating an undersaturated solution, or by careful hydrolysis of a solution of a labile silica precursor, such as a $SiCl_4$, esters of silica, $Si(OR)_4$, and the like, to provide a supersaturated solution of $Si(OH)_4$, from which precipitates amorphous silica.

Pyrogenic, or "fumed silica," which typically has a particle size from about 2–20 nm, is formed from the vapor phase. For example, silica (usually sand) can be vaporized at about 2000° C. and cooled to form anhydrous amorphous silica particles. Alternatively, silica can be sublimed at about 1500° C. in the presence of a reducing agent (e.g., coke) to form SiO, which can be oxidized to form particulate silica. Other methods of producing fumed silica include, for example, oxidation of $SiCl_4$ at high temperatures or burning $SiCl_4$ in the presence of methane or hydrogen.

Silica solutions exhibit polymerization behavior, resulting in the increase of Si—O—Si bonds and decrease of Si—OH bonds. In an aqueous medium, amorphous silica dissolves (and/or depolymerizes), forming $Si(OH)_4$, which undergoes polymerization to form discrete particles with internal Si—O—Si bonds and external Si—OH bonds on the particle surface. Under certain conditions, the polymeric silica particles thus formed will further associate to give chains and networks comprising the individual particles.

Generally, under neutral or alkaline conditions (pH 7 or greater), the particles tend to grow in size and decrease in number, whereas under acidic conditions (pH<7), the particles have a greater tendency to aggregate to form clusters, and eventually three-dimensional networks. Salts can be present to reduce the electrostatic repulsion between particles, so that aggregation of particles will be more likely to occur under neutral or alkaline conditions.

The term "sol" refers to a dispersion of discrete, colloidal particles, for example, of amorphous silica in an aqueous medium. If the sol is stable, a sol does not gel or settle even after several years of storage, and may contain up to about 50 wt. % silica and particle sizes up to 300 nm, although particles larger than about 70 nm settle slowly depending on the viscosity of the medium. A silica sol can be formed, for example, by growing particles to a certain size in a weakly alkaline solution, or by addition of dilute acid to a solution of sodium silicate (e.g., $Na_2SiO_3$) with rapid mixing, until the pH drops to about 8–10, followed by removal of $Na^+$ (e.g., by ion-exchange resin or electrodialysis). Silica sols, depending upon the type of silica, the particle size, and the nature of the particles, can be destabilized to form gels under mildly acidic to strongly acidic conditions.

The term "gel" refers to a coherent, rigid, continuous three-dimensional network of colloidal particles. Silica gels can be produced by the aggregation of colloidal silica particles (typically under acidic conditions when neutralizing salts are absent) to form a three dimensional gel microstructure. Whether a gel will form under a particular set of conditions, however, can depend on the silica properties, such as, for example, particle size and the nature of the particle surface. The term "hydrogel" refers to a gel in which the pores (spaces within the gel microstructure) are filled with water. Similarly, the term "alcogel" refers to a gel in which the pores are filled with an alcohol. When a gel is dried to form a xerogel, evaporation can result in a substantial collapse of the gel, giving a relatively high density collapsed powder. In contrast, when a gel is dried by means in which the gel microstructure is substantially preserved (e.g., supercritical drying as described in U.S. Pat. No. 3,652,214), a low density xerogel, known as an "aerogel" is formed. Silica aerogels may have very unusual and highly desirable properties such as, for example, optical transparency, extremely low density, and unprecedented low thermal conductivity. See Herrmann et al., *Journal of Non-Crystalline Solids,* 186, 380–387 (1995).

Synthetic silicas, such as the micronized silica xerogels and precipitates used as matting agents, typically are hydrophilic, owing to the silanol groups present on the surface of the silica particles. It is well-known that such silicas provide little, if any, thixotropy to the paint and can even cause other additives used for thixotropy to lose their effect.

Attempts have been made to produce a silica matting agent which has a limited deleterious effect on the thixotropy of a composition. For example, Aldcroft, *Polymers Paint Colour J.* 184, 423–425 (Sep. 7, 1994), describes modifying the structure of a silica gel to make an effective matting agent but which perturbs the thixotropy little. In addition, U.S. Pat. No. 5,221,337 (Lüers et al.) discloses that the modification of silica with an organic polyol compound can lead to a matting agent which has practically no negative effect on the thixotropy of a paint formulation. This approach, however, remains problematic, as the addition of both a thixotropic additive and a matting agent can lead to undesirable interactions in a paint formulation.

Thus, a need remains for a paint formulation that exhibits both an improved matting and thixotropic effect when applied to various substrates. The invention seeks to provide such a paint formulation. These and other advantages of the invention, as well as additional inventive features, will be apparent from the description of the invention provided herein.

BRIEF SUMMARY OF THE INVENTION

The invention is predicated, at least in part, on the surprising discovery that a silica-based matting agent can be utilized which contributes thixotropy to a paint formulation, and does not spoil the effect of other additives used to optimize the paint formulation. The invention provides a matt, thixotropic paint formulation comprising a resin system and a matting agent. The matting agent comprises a hydrophobic metal oxide, which has a surface moiety (i.e., one or more surface moieties) selected from the group consisting of trimethyl silyl, vinyl dimethyl silyl, acryl dimethyl silyl, and dimethyl silyl. Moreover, the paint formulation is characterized by having thixotropic properties such that it does not sag at a notch height of about 75 μm when measured with an anti-sag meter after application to a substrate. The invention also provides a method of producing such a paint formulation. The invention further provides a substrate having a surface coated with the matt, thixotropic paint formulation of the invention.

DETAILED DESCRIPTION OF THE INVENTION

The invention provides a matt, thixotropic paint formulation comprising (a) a resin system, and (b) a matting agent comprising a hydrophobic metal oxide, wherein the metal oxide has a surface moiety (i.e., one or more surface moieties) selected from the group consisting of trimethyl silyl, vinyl dimethyl silyl, acryl dimethyl silyl, and dimethyl silyl, and wherein the formulation, after application to a substrate, does not sag at a notch height of about 75 μm when measured with an anti-sag meter.

The resin system can comprise any suitable resin. Thus, the resin can be any resin, many of which are known by those of skill in the art, suitable for use in a paint formulation. Suitable resins include, for example, alkyds, acrylics, epoxies, urethanes, polyesters, cellulosics, and mixtures and precursors thereof. Preferably, the resin comprises at least one acrylic or at least one alkyd. Suitable acrylic resins for use in the paint formulation include those known as WOR-LEE CRYL A 1220 (E. H. Worlee & Co., Germany). More preferably, the resin comprises at least one alkyd. Among the useful alkyd resins are those known as Cargill 57-5806 (McWhorter Technologies, Inc.)

Any suitable amount of resin can be present in the paint formulation. For example, the resin can be present in the paint formulation in an amount of about 10–95 wt. %. Preferably, the resin is present in the paint formulation in an amount of about 20–75 wt. %, more preferably in an amount of about 25–50 wt. %.

The matting agent used in conjunction with the invention generally comprises a hydrophobic metal oxide. Any suitable metal oxide can be used in the context of the invention. Suitable metal oxides include silica, alumina, titania, zirconia, ceria, magnesia, and mixtures thereof, with silica being particularly preferred. The metal oxide is typically characterized as being pyrogenic (i.e., fumed), precipitated, an aerogel, or a xerogel, with an aerogel being particularly preferred. The term "aerogel" refers to a high-porosity, substantially amorphous, organic or inorganic gel where the pore liquid has been replaced with air. Most preferably, the aerogel comprises silica and is prepared by modifying the surface of a hydrogel with a silylating agent and drying the surface-modified gel. The silica aerogel produced by this process may be partially or completely hydrophobic depending on the degree and type of silylation. The silica aerogels disclosed in WO 98/23366 are especially desirable as the metal oxide in the paint formulation of the invention.

By treating the metal oxide with a silylating agent, the metal oxide exhibits a hydrophobic character. Indeed, the silylating agent imparts to the surface of the metal oxide particles a silyl moiety. Any suitable silyl moiety may be bonded to the metal oxide in the context of the invention to obtain the effect. Suitable silyl moieties are derived, for example, from compounds (e.g., silylating agents) of the following general formulae:

$$R_3Si\text{—}O\text{—}SiR_3 \qquad (I)$$

$$R_3Si\text{—}N(H)\text{—}SiR_3 \qquad (II)$$

wherein the radicals R are identical or different and are each hydrogen or a nonreactive, organic, linear, branched, cyclic, saturated or unsaturated, aromatic or heteroaromatic radical, preferably $C_1$–$C_{18}$ alkyl or $C_6$–$C_{14}$ aryl, more preferably $C_1$–$C_6$ alkyl, cycloalkyl, phenyl, vinyl, or acryl. Equally suitable silyl moieties can be derived from silanes of the formulae $R^1{}_{4-n}SiCl_n$ or $R^1{}_{4-n}Si(OR^2)_n$, where n=1–4, and $R^1$ and $R^2$ are identical or different and are each hydrogen or a nonreactive, organic, linear, branched, cyclic, saturated or unsaturated, aromatic or heteroaromatic radical, preferably a $C_1$–$C_{18}$ alkyl or $C_6$–$C_{14}$ aryl, and more preferably a $C_1$–$C_6$ alkyl, cyclohexyl, or phenyl. The radicals also can contain halogen substituents, such as fluorine or chlorine. Most preferably, the silyl moiety is a trimethyl silyl, a vinyl dimethyl silyl, an acryl dimethyl silyl, or a dimethyl silyl.

After treatment with a silylating agent, the metal oxide can be characterized by having a degree of hydrophobicity. The term "degree of hydrophobicity" refers to the ratio by volume of methanol in a methanol-water mixture that wets the metal oxide, thereby forming a homogeneous suspension. The metal oxide preferably is characterized by a degree of hydrophobicity of at least about 40%. The degree of hydrophobicity desirably is as high as possible inasmuch as a higher degree of hydrophobicity generally provides an improved thixotropic effect.

The contact between the metal oxide particles and the silylating agent can be achieved by any suitable means. For example, a silylating agent can be sprayed onto the metal oxide particles before being mixed with a carrier. It is preferred, however, that the contact between metal oxide particles and a silylating agent comprise adding at least one silylating agent to a metal oxide in a suitable carrier or solvent (e.g., water). For example, a solution of a silylating agent in water can be added to an aqueous mixture of a metal oxide.

The relative ratio of the total amount of silylating agent to the total amount of metal oxide must be high enough so that a sufficient amount of the metal oxide particles contact the silylating agent. Therefore, the metal oxide can be present in the paint formulation in an amount of about 0.1–30 wt. %, preferably about 0.2–25 wt. %, and most preferably about 0.5–15 wt. %.

The thixotropy of the paint formulation can be measured by any technique known in the art. For purposes of the invention, the thixotropy is typically measured with an anti-sag meter, such as, for example, the Type 419 or the equivalent Leneta sag-resistance applicator (Erichsen GmbH, Germany). In such a technique, a paint formulation is applied to a substrate and drawn downwards by an applicator. The applicator comprises various notch heights along its length, typically ranging from 25–300 $\mu$m. When paint is drawn over the substrate by the applicator, stripes of paint are formed on the substrate with increasing thicknesses corresponding to the respective notch heights on the applicator. The horizontal substrate is then rotated to be vertical, such that the stripes are horizontal, and the sagging behavior of each stripe of paint is then visually determined. Paint formulations of the present invention are characterized as being resistant to sagging at a notch height of about 75 $\mu$m, which is recognized in practice as indicating non-sagging/non-dripping behavior. It will be understood that as the thixotropy of a paint increases so too will the maximum notch height at which sagging is not detected.

The paint formulation of the invention, after application to a substrate, will also be characterized by providing a matt finish to the substrate. If such a matt finish is desired, the paint formulation can be characterized by a 60° gloss level of 50 gloss units or less (as measured by a BYK-Gardner gloss meter). More preferably the paint formulation is characterized by a 60° gloss level of 40 gloss units or less (e.g., 30 gloss units or less). Matt surfaces are desirable for many applications. For example, the reduced glare of surfaces in schools, hospitals, and universities offers less chance of visual distraction, and concentration is better in such environments. Such finishes also demonstrate less tendency to become unsightly as time progresses, as small scratches and imperfections are less obvious than on gloss surfaces.

The metal oxide will be in the form of discrete individual particles, of an aggregated or non-aggregated state. The metal oxide particles can have any suitable diameter. Generally, the metal oxide has a median particle diameter of about 1–15 $\mu$m. It is preferred, however, for the metal oxide to have a median particle diameter of about 2–10 $\mu$m. Alternatively, the particles can initially be larger (e.g., about 5 mm) and subsequently broken down to the desired size during the manufacture of the paint formulation.

The metal oxide can have any suitable surface area. Generally, the metal oxide has a surface area of at least about 100 m$^2$/g, preferably at least about 200 m$^2$/g, and most preferably at least about 300 m$^2$/g. In certain embodiments, it is suitable for the metal oxide to have a surface area of at least about 400 m$^2$/g, at least about 500 m$^2$/g, or even at least about 600 m$^2$/g. Generally, the surface area of the metal oxide will not exceed 900 m$^2$/g and will be about 100–900 m$^2$/g. The surface area of the metal oxide can be measured by any suitable method known in the art. Typically, the surface area of the metal oxide is determined by the method of S. Brunauer, P. H. Emmet, and I. Teller. *J. Am. Chemical Society,* 60, 309 (1938), which is commonly referred to as the BET method.

The metal oxide also can have any suitable tap density, such as about 0.01–0.2 g/cm$^3$. To measure the tap density, a known mass of the dry powder is transferred to a 10 cm$^3$ graduated cylinder and tapped 40 times by hand. The volume is then noted, and the density is calculated as mass/volume.

The metal oxide can have any suitable porosity. Typically the metal oxide has a porosity of about 50% or more, preferably about 70% or more, and most preferably about 80% or more, since it is known that higher porosity leads to more effective matting.

Any suitable carrier (e.g., solvent) can be used in the paint formulation, if desired. A carrier is used to facilitate the application of the resin and metal oxide onto the surface of a suitable substrate. Suitable carriers include inorganic carriers such as water, as well as organic carriers such as hydrocarbons, alcohols, ketones, esters, ethers, aromatics, alkanes, and mixtures thereof. Any suitable concentration of carrier can be present in the paint formulation, such as up to about 80 wt. %.

When desired, the paint formulation can further comprise at least one thixotropic additive. Although the matting agent (i.e., silyl-treated metal oxide) is sufficient to impart to the paint formulation desirable thixotropic and matting effects, a thixotropic additive can be included in the formulation to further enhance the thixotropy of the paint formulation. Suitable thixotropic additives included, for example, chemically treated fumed silica, organically modified clay, modified alkyds, and the like. Preferably the thixotropic additive is based on an alkyd with an amide- or urethane-modified alkyd being particularly preferred. Generally, the thixotropic additive can be present in the paint formulation in an amount of about 0.5–5 wt. %, or, particularly in the case of modified resins, up to 50 wt. %.

The paint formulation can further comprise any of a variety of other additives that are known in the art to be suitable for incorporation into a paint formulation. Suitable additives can include, for example, cationic surfactants, anionic surfactants (e.g., long-chain alkylbenzene sulfonate salts and long-chain, preferably branched chain, alkylsulfosuccinate esters), nonionic surfactants (e.g., polyalkylene oxide ethers of long-chain, preferably branched-chain, alkyl group-containing phenols, polyalkylene oxide ethers of long-chain alkyl alcohols, and fluorinated surfactants), hardeners (e.g., active halogen compounds, vinylsulfone compounds, aziridine compounds, epoxy compounds, acryloyl compounds, isocyanate compounds, etc.), pigment dispersants, thickeners, flowability improvers, antifoamers (e.g., octyl alcohol, silicone-based antifoamers, etc.), foam inhibitors, releasing agents, foaming agents, penetrants, coloring dyes, coloring pigments, whiteners (e.g., fluorescent whiteners), preservatives (e.g., p-hydroxybenzoate ester compounds, benzisothiazolone compounds, isothiazolone compounds, etc.), antimar and antislip additives (such as waxes and silicones), curing agents and crosslinkers, antifungal agents, yellowing inhibitors (e.g., sodium hydroxymethanesulfonate, sodium p-toluenesulfinate, etc.), ultraviolet absorbers (e.g., benzotriazole compounds having a hydroxy-dialkylphenyl group at the 2-position), antioxidants (e.g., sterically hindered phenol compounds), antistatic agents, pH regulators, water-resisting agents, wet strengthening agents, and dry strengthening agents.

Additional pigments other than the metal oxide can be present in the paint formulation. Such pigments include, for example, calcium carbonate, clays, aluminum silicates, urea-formaldehyde fillers, and the like, as well as other hydrophilic matting agents. Other suitable pigments include alumina (e.g., alumina sols, colloidal alumina, cationic aluminum oxide or hydrates thereof, pseudoboehmite, etc.), magnesium silicate, magnesium carbonate, kaolin, talc, calcium sulfate, barium sulfate, titanium dioxide, zinc oxide, zinc sulfide, zinc carbonate, satin white, diatomaceous earth, calcium silicate, aluminum hydroxide, lithopone, zeolite, hydrated halloycite, magnesium hydroxide, polyolefins (e.g., polystyrene, polyethylene, polypropylene, etc.), plastics (e.g., acrylic), urea resin, and melamine resin. For preparation of a colored paint formulation, any conventional colored pigments may be used. Such pigments include the Sico-Flush pigments available from BASF AG, Ludwigshafen, Germany.

A number of other additives can be present in the paint formulation and are particularly contemplated for use in a water-based paint formulation. For example, a coalescing agent, a flow additive, a defoamer, a surfactant, a rust inhibitor and a pH regulator are all suitable additives which can be incorporated, if desired.

A coalescing agent can be present to promote the softening of the resin during drying of the components of the paint formulation, and such materials are well known. One example of a coalescing agent is BUTYL CELLOSOLVE (ARCO Chemical Company, Newtown Square, Pa.). Any suitable concentration of coalescing agent can be present in the paint formulation, such as about 1–35 wt. %.

A flow additive can be present to promote the wetting of the substrate by the paint formulation and the leveling of the paint formulation. A typical flow additive is DISBERBYK 301 (BYK-Chemie, Germany). Any suitable concentration of flow additive can be present in the paint formulation, such as about 0.5–4 wt. %.

A defoamer can be present to reduce the presence of bubbles in the paint formulation upon mixing of the components. Any suitable defoamer can be used in the paint formulation of the invention. One preferred defoamer is DISBERBYK 035 (BYK-Chemie, Germany). Any suitable concentration of defoamer can be present in the paint formulation, such as about 0.01–3 wt. %.

A surfactant can be utilized to reduce the surface tension of the paint formulation. Any suitable surfactant can be used in the paint formulation of the invention. One preferred surfactant is SURFYNOL 104 BC (Air Products & Chemicals, Inc.). Any suitable concentration of surfactant can be present in the paint formulation, such as about 0.01–3 wt. %.

If the paint formulation is applied to surfaces vulnerable to corrosion, a rust inhibitor can be added to the paint formulation. A variety of rust inhibitors are suitable in the context of the invention. One preferred rust inhibitor is ammonium benzoate. Any suitable concentration of rust inhibitor can be present in the paint formulation, such as about 0.01–2 wt. %.

A pH regulator can be present to control the pH of the paint formulation. The pH of the paint formulation is maintained in a range generally suitable for paint formulations, particularly in the context of the substrate intended to be coated with the formulation. Any suitable pH regulator can be used in the paint formulation of the invention. For example, the pH can be regulated via the addition of an acid (e.g., mineral acid, acidic cation exchange resin, etc.) or a base (e.g., an alkali metal hydroxide, basic anion exchange resin, etc.). One preferred pH regulator is ammonium hydroxide. Any suitable concentration of pH regulator can be present in the paint formulation, such as about 1–4 wt. %.

The invention also provides a method of producing a matt, thixotropic paint formulation comprising (a) providing a hydrophobic metal oxide, wherein the metal oxide has a surface moiety (i.e., one or more surface moieties) selected from the group consisting of trimethyl silyl, vinyl dimethyl silyl, acryl dimethyl silyl, and dimethyl silyl, and wherein the formulation, after application to a substrate, does not sag at a notch height of about 75 $\mu$m when measured with an anti-sag meter, and (b) mixing the metal oxide with a resin to form the paint formulation. Optionally, the resin and metal oxide can be mixed together with a suitable carrier. The resin, hydrophobic metal oxide, carrier, and paint formulation characteristics are described above with respect to the inventive paint formulation. Other possible components of the paint formulation similarly are described above.

The invention also encompasses a substrate having a surface coated with the paint formulation disclosed herein. Any substrate suitable for the application of a paint formulation is contemplated by the invention. Such substrates include, for example, wood, plastics, and metal. Preferably the substrate is wood.

A substrate can be treated with the paint formulation by any suitable technique. For example, the paint formulation can be applied to the substrate by airless and electrostatic spray, brushing, dip, flowcoat, and roller coating. While one coating of the paint formulation of the invention can be sufficient to impart a desired effect to a substrate (e.g., a matt finish), more than one coating of a paint formulation can be applied, which can be the same or different. In addition, the flexibility and adhesion of the coating desirably is sufficient to permit later forming of the substrate into parts for various manufacturing operations.

EXAMPLE

This example further illustrates the invention but, of course, should not be construed as in any way limiting its scope. In particular, this example illustrates the excellent matt finish a paint formulation of the invention imparts to a substrate.

A paint formulation of the invention was prepared by mixing the components in their respective amounts as set forth in the Table below. The matting agent used was a hydrophobic (i.e., silyl-treated) silica aerogel having a surface area of about 690 $m^2/g$, a median particle size of about 7.6 $\mu$m, and a tap density of about 0.04 $g/cm^3$.

TABLE

| Component | Amount (wt. %) |
| --- | --- |
| long-oil alkyd resin | 35 |
| thixotropic alkyd resin | 20 |
| calcium octoate | 0.5 |
| yellow pigment dispersion | 2.5 |
| red pigment dispersion | 2 |
| black pigment dispersion | 0.5 |
| polymeric surfactant | 0.2 |
| methylethyl ketoxime | 0.5 |
| zirconium-based drier | 2.4 |
| aliphatic hydrocarbons | 33.4 |
| matting agent | 3 |

After mixing the components to produce the paint formulation, a layer of the paint formulation was applied to a wood substrate and allowed to dry. The paint coating on the substrate was then visually examined for its mattness. The paint formulation was found to yield a very desirable matt finish to the wood substrate. The paint formulation showed visually no tendency to sagging during application to the substrate or during drying on the substrate. These results indicate that a paint formulation of the invention can be used to produce a matt finish on a substrate.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A matt, thixotropic paint formulation comprising
   (a) a resin system, and
   (b) a matting agent comprising a hydrophobic metal oxide, wherein the metal oxide has a surface moiety selected from the group consisting of trimethyl silyl, vinyl dimethyl silyl, acryl dimethyl silyl, and dimethyl silyl, and wherein the formulation, after application to a substrate, does not sag at a notch height of about 75 $\mu$m when measured with an anti-sag meter.

2. The formulation of claim 1, wherein the metal oxide is a silica aerogel, silica xerogel, or precipitated silica.

3. The formulation of claim 1, wherein the formulation is further characterized by a 60° gloss level of about 40 gloss units or less.

4. The formulation of claim 3, wherein the formulation is characterized by a 60° gloss level of about 30 gloss units or less.

5. The formulation of claim 1, wherein the resin system is selected from the group consisting of alkyds, acrylics, epoxies, urethanes, polyesters, cellulosics, and mixtures thereof.

6. The formulation of claim 5, wherein the resin system comprises at least one alkyd.

7. The formulation of claim 5, wherein the resin system comprises at least one acrylic.

8. The formulation of claim 1, wherein the formulation further comprises a carrier.

9. The formulation of claim 8, wherein the carrier is water.

10. The formulation of claim 8, wherein the carrier is an organic solvent selected from the group consisting of hydrocarbons, alcohols, ketones, esters, ethers, and mixtures thereof.

* * * * *

UNITED STATES PATENT AND TRADEMARK OFFICE
CERTIFICATE OF CORRECTION

| | | |
|---|---|---|
| PATENT NO. | : 6,720,368 B2 | Page 1 of 2 |
| APPLICATION NO. | : 10/094391 | |
| DATED | : April 13, 2004 | |
| INVENTOR(S) | : Rex J. Field | |

It is certified that error appears in the above-identified patent and that said Letters Patent is hereby corrected as shown below:

Col. 4, lines 1-34 should read
11. The formulation of claim 1, wherein the metal oxide is characterized by a degree of hydrophobicity of at least about 40%.
12. The formulation of claim 1, wherein the metal oxide has a median particle diameter of about 1-15 um.
13. The formulation of claim 1, wherein the resin is present in an amount of about 10-95 wt.%, and the metal oxide is present in an amount of about 0.5-15 wt.%.
14. The formulation of claim 1, wherein the formulation further comprises a thixotropic additive.
15. The formulation of claim 14, wherein the thixotropic additive is based on an alkyd.
16. The formulation of claim 15, wherein the alkyd is an amide- or urethane- modified alkyd.
17. A substrate having surface coated with the formulation of claim 1.
18. A method of treating a substrate comprising applying the formulation of claim 1 to a surface of the substrate.
19. A method of producing a producing a matt, thixotropic paint formulation comprising:
    (a) providing a hydrophobic metal oxide, wherein the metal oxide has a surface moiety selected from the group consisting of trimethyl silyl, vinyl dimethyl silyl, acryl dimethyl silyl, and dimethyl silyl, and wherein the formulation, after application to a substrate, does not sag at a notch height of about 75 um when measured with an anti-sag meter, and
    (b) mixing the metal oxide with a resin to form a paint formulation.
20. The method of claim 19, wherein the metal oxide is a silica aerogel, silica xerogel, or precipitated silica.
21. The method of claim 19, wherein the formulation is further characterized by a 60 gloss level of about 40 gloss units or less.
22. the method of claim 21, wherein the formulation is further characterized by a 60 gloss level of about 30 glass units or less.
23. The method of claim 19, wherein the resin system is selected from the group consisting of alkyds, acrylics, epoxies, urethanes, polyesters, cellulosics, and mixtures thereof.
24. The method of claim 23, wherein the resin system comprises at least one alkyd.
25. The method of claim 23, wherein the resin system comprises at least one acrylic.
26. The method of claim 19, wherein the formulation further comprises a carrier.
27. The method of claim 26, wherein the carrier is water.
28. The method of claim 26, wherein the carrier is an organic solvent selected from the group consisting of hydrocarbons, alcohols, ketones, esters, ethers, and mixtures thereof.

UNITED STATES PATENT AND TRADEMARK OFFICE
CERTIFICATE OF CORRECTION

PATENT NO. : 6,720,368 B2
APPLICATION NO. : 10/094391
DATED : April 13, 2004
INVENTOR(S) : Rex J. Field It is certified that error appears in the above-identified patent and that said Letters Patent is hereby corrected as shown below:

29. The method of claim 19, wherein the metal oxide is characterized by a degree of hydrophobicity of at least about 40%.
30. The method of claim 19, wherein the metal oxide has a medium particle diameter of about 0.2-15 um.
31. The method of claim 19, wherein the resin is present in an amount of about 10-95 wt.%, and the metal oxide is present in an amount of about 0.5-15 wt.%.
32. the method of claim 19, wherein the formulation comprises a thixotropic additive.
33. The method of claim 32, wherein the thixotropic additive is based on an alkyd.
34. the method of claim 33, wherein the alkyd is an amide- or urethane- modified alkyd.

Signed and Sealed this

Twenty-eighth Day of July, 2009

JOHN DOLL
*Acting Director of the United States Patent and Trademark Office*